United States Patent [19]
Fujimori et al.

[11] Patent Number: 6,133,972
[45] Date of Patent: Oct. 17, 2000

[54] LIQUID CRYSTAL DISPLAY DEVICE AND METHOD FOR PRODUCING THE SAME

[75] Inventors: Kohichi Fujimori, Nabari; Tokihiko Shinomiya; Shuichi Kozaki, both of Nara, all of Japan

[73] Assignee: Sharp Kabushiki Kaisha, Osaka, Japan

[21] Appl. No.: 08/825,004

[22] Filed: Mar. 26, 1997

[30] Foreign Application Priority Data

Mar. 26, 1996 [JP] Japan .................................. 8-070780

[51] Int. Cl.$^7$ ................................................ G02F 1/1333
[52] U.S. Cl. ........................................ 349/86; 252/299.65
[58] Field of Search .................................. 349/156, 187, 349/93, 180, 89; 252/299.65, 299.01, 299.67, 299.64

[56] References Cited

U.S. PATENT DOCUMENTS 5,114,614  5/1992  Emoto et al. ..................... 252/299.01
5,450,220  9/1995  Onishi et al. ............................ 349/89

FOREIGN PATENT DOCUMENTS 6-265899   9/1994   Japan .
6-301015  10/1994   Japan .
7-218915   8/1995   Japan .
7-258641  10/1995   Japan .

*Primary Examiner*—Frank G. Font
*Assistant Examiner*—Tu T. Nguyen
*Attorney, Agent, or Firm*—Dike, Bronstein, Roberts & Cushman, LLP; David G. Conlin; William J. Daley, Jr.

[57] ABSTRACT

A liquid crystal display device includes: a pair of substrates; polymer walls; and a display medium interposed between the pair of substrates, including a liquid crystal region partially provided with or completely surrounded by the polymer walls. The liquid crystal region includes a liquid crystal material having a helical pitch, the helical pitch being either unchanged or reduced upon rise in temperature.

3 Claims, 3 Drawing Sheets

Temperature

Vicinity of $T_{N-I}$

Droplets of liquid crystal material

Liquid crystal region 4

Polymer wall 7

LIQUID CRYSTAL DISPLAY DEVICE AND METHOD FOR PRODUCING THE SAME

BACKGROUND OF THE INVENTION

1. Field of the Invention

The present invention relates to a liquid crystal display device widely incorporated in a liquid crystal panel for OA (Office Automation) apparatus, AV (Audio Vidual) apparatus or the like, and a method for producing the liquid crystal display device.

2. Description of the Related Art

Presently, various display modes have been found for liquid crystal display devices. Particularly, liquid crystal display devices having TN (Twisted Nematic) display modes, STN (Super Twisted Nematic) display modes, or the like, are mass-produced.

Usually, a liquid crystal material used for realizing any one of the above-mentioned modes is used with a chiral agent which adjusts a helical pitch of the liquid crystal material. The helical pitch of the liquid crystal material can be controlled and determined whether to increase or decrease upon a rise in the temperature in accordance with the kind of the chiral agent to be used.

Presently, CN (Cholesteryl nonanoate produced by Chisso Corp.) or S-811 (produced by Merck & Co., Inc.) is generally used as the chiral agent. These chiral agents increase the helical pitch of the liquid crystal material upon rise in temperature. Generally, the helical pitch of the liquid crystal material may be either increased or decreased upon a rise in the temperature as long as a stable orientation, i.e., a stable d/p value of liquid crystal molecules can be achieved at an operating temperature of the liquid crystal display device, namely, a temperature in a range of about 0° C. to about 40° C. The d/p value is defined by a thickness d of a liquid crystal cell and a helical pitch p, of the liquid crystal material.

A technique is described in Japanese Laid-Open Patent Publication No. 7-258641 in which a mixture of two kinds of optically active substances is used where one increases a helical pitch of a liquid crystal material and the other decreases the helical pitch of the liquid crystal material upon a rise in the temperature. Accordingly, a helical pitch of the liquid crystal material hardly changes upon a rise in the temperature.

As described in Japanese Laid-Open Patent Publication No. 7-218915, in the case where a surface of each substrate is rubbed, the twist angle of the liquid crystal molecules is determined by a helical pitch p obtained at a nematic-isotropic phase transition temperature (hereinafter, simply referred to as "$T_{N-I}$") (C°) of a liquid crystal material with a chiral agent added, a cell thickness d and surface controlling force caused by a rubbing treatment. Therefore, the difference between a d/p value obtained at the vicinity of $T_{N-I}$ and a d/p value obtained at a temperature where the liquid crystal display device is in operation should not be large.

Moreover, Japanese Laid-Open Patent Publication No. 6-265899 describes a method for obtaining an orientation at an interface of each substrate without performing a rubbing treatment and by utilizing a helical pitch of a liquid crystal material. According to this method, a chiral agent is used that decreases the helical pitch of the liquid crystal material upon a rise in temperature so as to restrain stripe domains from generating, thereby preventing deteriorations of a display contrast and a response rate of the display. In this case, liquid crystal molecules are oriented in a twisted manner, the orientation being determined by a d/p value at $T_{N-I}$ of the liquid crystal material with the chiral agent added. Thus, for example, in order to produce a TN type liquid crystal display device having liquid crystal molecules twisted by 90° between a pair of substrates, the cell gap (the cell thickness) d and the helical pitch p of a liquid crystal cell is adjusted so as to satisfy the relationship, d/p=0.25 at the vicinity of the $T_{N-I}$. The present inventors have proposed a liquid crystal display device including a display medium having liquid crystal regions microscopically divided by polymer walls (Japanese Laid-Open Patent Publication No. 6-301015). The liquid crystal display device is produced as follows.

First, a pair of substrates, each having transparent electrodes for driving the liquid crystal display device, are provided in an opposing manner such that the transparent electrodes are located inside. Subsequently, a mixture containing at least a liquid crystal material, a chiral agent, a photopolymerizable resin and a photopolymerization initiator is interposed between the opposing pair of substrates. Then, the substrates including the mixture are heated to such a degree that the display medium inside is in an isotropic state. Thereafter, UV light having distribution of weak and strong intensities is radiated to the mixture while maintaining the temperature.

Then, the liquid crystal material and the photopolymerizable resin are phase separated by gradually cooling to room temperature with the photopolymerizable resin placed in regions radiated with light of strong intensity and the liquid crystal material placed in regions radiated with light of weak intensity, thereby producing the liquid crystal device.

SUMMARY OF THE INVENTION

In the above-described method for producing a liquid crystal display device, the liquid crystal material and the photopolymerizable resin are gradually cooled to phase separate after being irradiated with UV light.

The orientation state of the liquid crystal molecules is roughly determined during the cooling step at the vicinity of $T_{N-I}$ where droplets of the liquid crystal material start to appear. A significant amount of photopolymerizable resin still remains in the liquid crystal material at the vicinity of $T_{N-I}$. In this case, if a chiral agent is used that increases the helical pitch of the liquid crystal material upon a rise in temperature, the liquid crystal material tends to have a helical pitch longer than that of a liquid crystal material having no photopolymerizable resin remaining therein. Since the orientation of liquid crystal molecules is affected by a d/p value, in the above case, the longer helical pitch results in a smaller d/p value. As a result, the liquid crystal molecules do not orient in an intended twisted manner and often exhibit orientation with a smaller twist angle. For example, in the case of producing an STN type liquid crystal display device with a twist angle of 240°, when the d/p value is smaller than the intended d/p value due to the increased helical pitch, a so-called low twisting phenomenon is caused in which case the liquid crystal molecules are not twisted by 240° but by 60°. Accordingly, when a chiral agent is used which increases a helical pitch of the liquid crystal material upon a rise in temperature, orientation of the liquid crystal molecules become unstable, thereby causing a problem of not being able to obtain an intended pitch.

According to one aspect of the present invention, a liquid crystal display device includes: a pair of substrates; polymer walls; and a display medium interposed between the pair of substrates, including a liquid crystal region partially provided with or completely surrounded by the polymer walls. The liquid crystal region includes a liquid crystal material having a helical pitch, the helical pitch being either unchanged or reduced upon rise in temperature.

In one embodiment of the present invention, liquid crystal molecules in the liquid crystal regions are oriented in a twisted manner.

In another embodiment of the present invention, the liquid crystal molecules have a twisted angle of about 240°.

In another embodiment of the present invention, liquid crystal molecules in the liquid crystal region are oriented in an axially-symmetric manner with respect to an axis perpendicular to the pair of substrates.

According to another aspect of the present invention, a method for producing a liquid crystal display device includes the steps of: arranging a pair of substrates to oppose each other with a predetermined gap therebetween; injecting a mixture containing at least a liquid crystal material, a photopolymerizable material and a photopolymerization initiator between the pair of substrates; irradiating the mixture with light while heating the mixture; and gradually cooling the mixture to phase-separate the liquid crystal material and the photopolymerizable material contained in the mixture. The liquid crystal material has a helical pitch, the helical pitch being either unchanged or reduced upon rise in temperature.

In one embodiment of the present invention, liquid crystal molecules in the liquid crystal material are oriented in a twisted manner.

In another embodiment of the present invention, the liquid crystal molecules have a twisted angle of about 240°.

In another embodiment of the present invention, liquid crystal molecules in the liquid crystal material are oriented in an axially-symmetric manner with respect to an axis perpendicular to the pair of substrates.

According to the present invention, a display medium provided between a pair of substrates is gradually cooled to room temperature after a light radiation in order to phase separate a liquid crystal material and a photopolymerizable resin contained in the display medium such that the display medium has liquid crystal regions made of the liquid crystal material and polymer walls surrounding the liquid crystal regions. In this case, the display medium contains a chiral agent which either reduces or does not change a helical pitch p of the liquid crystal material upon a rise in temperature. Such a chiral agent allows a d/p value to stay in a range capable of obtaining an originally intended twist angle at the vicinity of $T_{N-I}$ where the droplets of the liquid crystal material start to appear. Thus, the desired twist angle can be obtained which is roughly determined at the vicinity of $T_{N-I}$.

Thus, the invention described herein makes possible the advantages of (1) providing a liquid crystal display device capable of achieving an intended helical pitch of a liquid crystal material and (2) providing a method for producing the liquid crystal display device.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings without being limited thereto.

EXAMPLE 1

Figure 1:
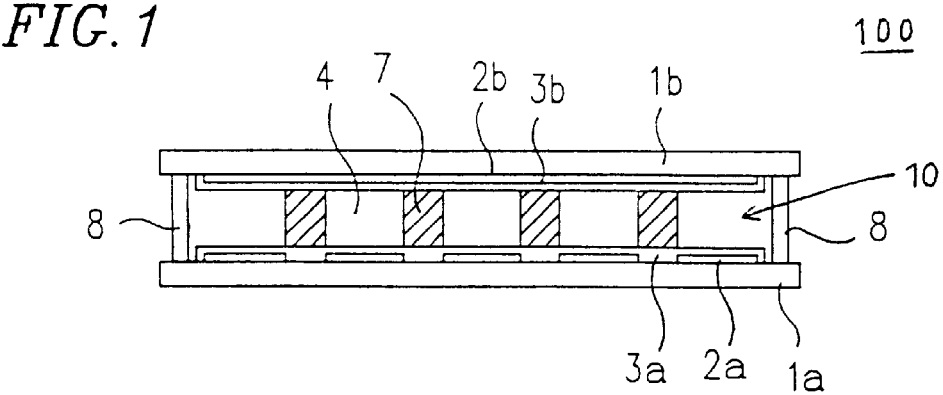
FIG. 1 is a cross-sectional view showing a liquid crystal display device according to an example of the present invention.

FIG. 1 is a cross-sectional view showing a liquid crystal display device 100 according to a first example of the present invention. The liquid crystal display device 100 includes a pair of substrates 1a and 1b and a display medium 10 interposed between the pair of substrates 1a and 1b. The liquid crystal display medium 10 includes liquid crystal regions 4 completely surrounded by polymer walls 7. Alternatively, the liquid crystal regions 4 may be partially surrounded by the polymer walls 7.

A sealing resin 8 is provided around the periphery of the pair of substrates 1a and 1b sandwiching the display medium 10, thereby preventing the display medium from leaking. As shown in FIG. 1, striped transparent electrodes 2a are formed on a surface of the lower substrate 1a on a display medium side. An alignment film 3a is provided on the substrate 1a so as to cover the transparent electrodes 2a. Moreover, striped transparent electrodes 2b are formed on a surface of the upper substrate 1b on the display medium side so that the transparent electrodes 2a and 2b intersect each other. An alignment film 3b is provided on the substrate 1b so as to cover the transparent electrodes 2b. Furthermore, a phase plate and a polarizing plate (not shown) are provided on each of the outer surfaces of the substrates 1a and 1b, thereby obtaining the liquid crystal display device 100.

Hereinafter, a method for producing the above-described liquid crystal display device will be described.

First, 1.73 parts of CN (cholesteryl nonanoate produced by Chisso Corp.) and 1.73 parts of CM-21 (produced by Chisso Corp.) are added as chiral agents per 100 parts of SP 4862 (produced by Chisso Corp.) as a liquid crystal material for an STN display. Furthermore, a photopolymerizable resin and a photopolymerization initiator are added. Herein, 7.0% of stearylacrylate and 4.5% of R-684 (produced by Nippon Kayaku Co., Ltd.) are used as the photopolymerizable resins, and 0.5% of Irgacure 651 (CIBA-GEIGY Corporation) is used as the photopolymerization initiator.

Figure 2:
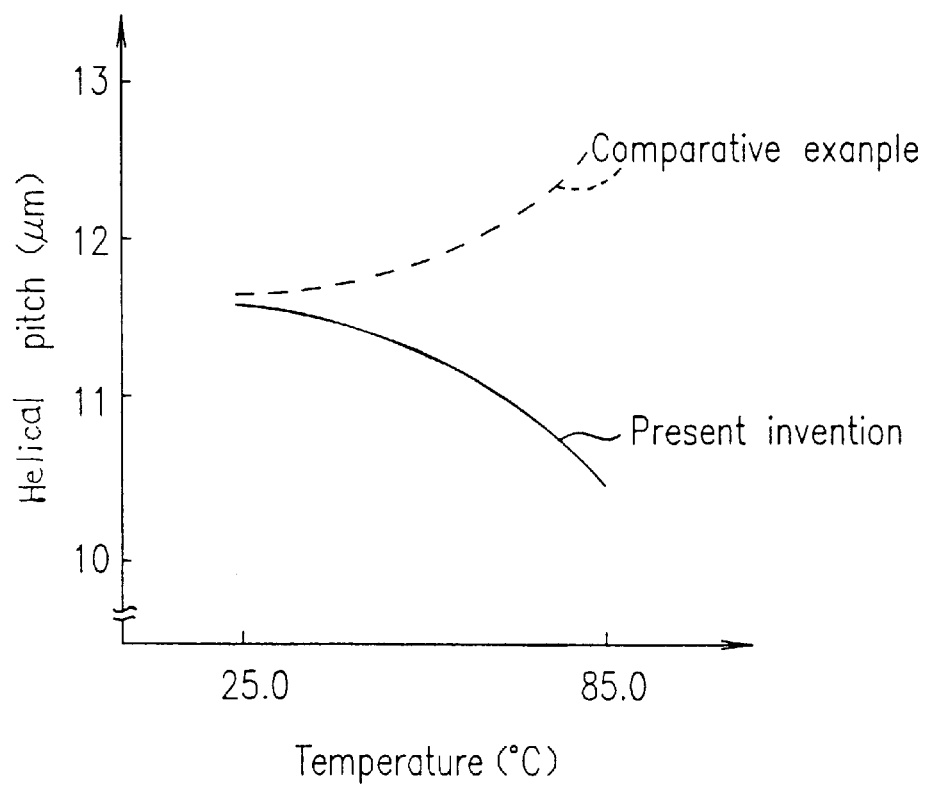
FIG. 2 is a graph where the solid line represents change in a pitch of a liquid crystal material according to the present invention and the broken line represents change in a pitch of a liquid crystal material according to a comparative example, both cases depending on the temperature.

FIG. 2 is a graph where the solid line represents change in a helical pitch of the liquid crystal material contained in the above-described mixture depending on the temperature. In the graph, the horizontal axis represents the temperature (C°) and the vertical axis represents the helical pitch ($\mu$m). As can be appreciated from the graph, the helical pitch becomes smaller as the temperature rises. Additionally, deterioration of a steepness in a voltage-transmission characteristic caused by the helical pitch of the liquid crystal material does not induce any problem in an operating temperature range of the liquid crystal display device, i.e., about 0° C. to 40° C.

After preparing the above-described mixture, the transparent electrodes 2a and 2b are formed on the surfaces of the two substrates 1a and 1b, respectively. Then, the substrates 1a and 1b are provided in an opposing manner with the transparent electrodes 2a and 2b located inside. The sealing resin 8 is provided around the periphery of the substrates 1a and 1b. In this circumstance, for example, when the gap between the substrates 1a and 1b is desired to be 6 $\mu$m, the substrates 1a and 1b may be sealed with plastic beads (not shown) having a diameter of 6 $\mu$m, dispersed therebetween. In order to ensure the gap to be maintained, the spacers (not shown) are preferably provided where polymer walls 7 are to be formed.

Then, the prepared mixture is interposed between the opposing substrates 1a and 1b by injection, or the like, through an opening for injection where the sealing resin 8 is not provided.

Then, the obtained structure is heated to such a degree that the mixture sandwiched by the substrates 1a and 1b is in an isotropic liquid state. In the first example, the structure is heated at a temperature of approximately 100° C.

Thereafter, the mixture is exposed to UV light while maintaining the above-mentioned temperature. Herein, the mixture is irradiated under a high-pressure mercury lamp with an illuminance of about 7 mW/cm$^2$ for about 5 minutes. Additionally, the UV light having distribution of strong and weak intensities is employed in order to phase separate the liquid crystal material and the photopolymerizable resin so as to form the polymer walls 7 and the liquid crystal regions 4 at predetermined positions. The light having the distribution of strong and weak intensities is obtained, for example, by radiating the light through a metal photomask, or the like, provided outside the substrate, or through an ITO electrode, a color filter, a reflection plate, or the like, as a photomask. However, the present invention is not limited thereto.

Figure 3A:
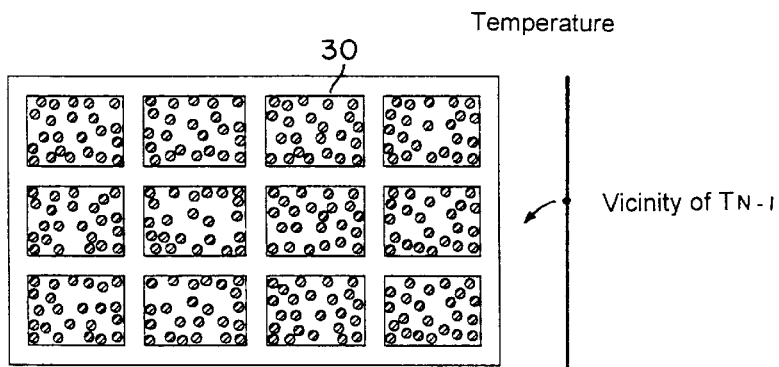
FIG. 3A is a plan view showing droplets of a liquid crystal material of a liquid crystal device appearing at the vicinity of $T_{N-I}$.

Then, cooling is conducted at a rate of –0.05° C. to –0.2° C. per minute, preferably –0.1° C. to –0.15° C. per minute. In the first example, the structure is cooled at a rate of –0.1° C. per minute. During the cooling step, the mixture starts to phase separate, whereby, as shown in FIG. 3A, droplets 30 of the liquid crystal material which eventually form the liquid crystal regions 4 start to appear in the regions irradiated with light having weak intensity. In the first example, the droplets 30 include liquid crystal molecules twisted by 240° between the substrates 1a and 1b and no droplet includes liquid crystal molecules twisted by 60°.

Figure 3B:
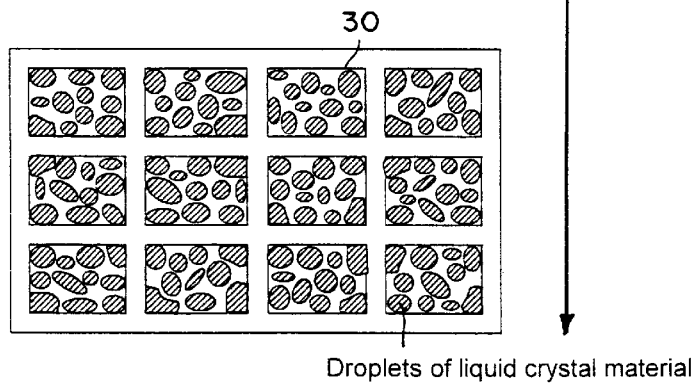
FIG. 3B is a plan view showing droplets of the liquid crystal material of the liquid crystal device obtained upon further cooling.

As shown in FIG. 3B, as the temperature further declines, the number of the droplets 30 increases. The droplets bind with each other and gather in regions irradiated with UV light of weak intensity, thereby forming the liquid crystal regions 4. During this process, the liquid crystal molecules in the droplets remain twisted by 240°. The cooling step is performed until reaching room temperature of about 20° C.

Figure 4:
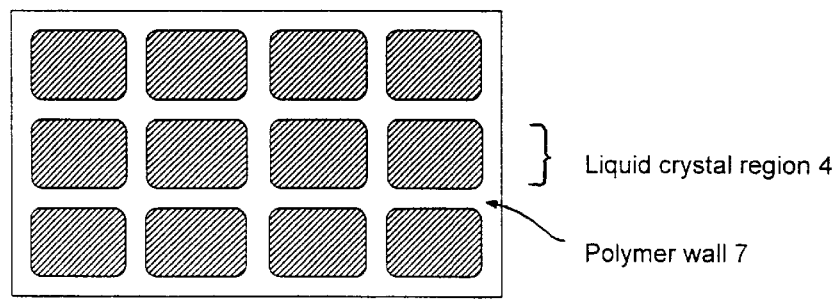
FIG. 4 is a plan view showing a liquid crystal material and a chiral agent which have been cooled to phase-separate according to a method of the present invention.
Figure 5:
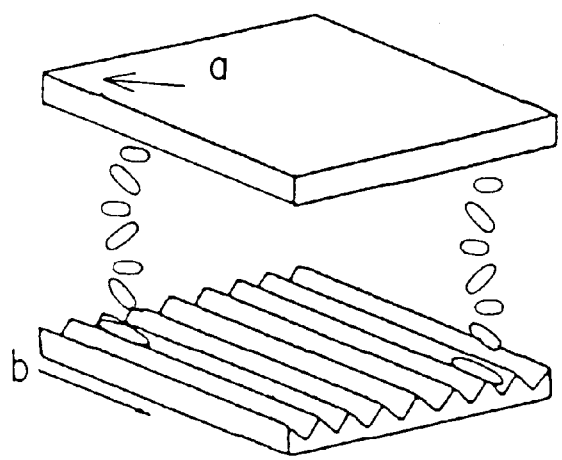
FIG. 5 is a perspective view schematically showing the liquid crystal molecules twisted by 240° between the substrates according to the present invention.

Observation of the obtained display medium 10, as shown in FIG. 4, revealed that the liquid crystal material and the photopolymerizable resin were phase separated. Each liquid crystal region 4 exhibited an STN orientation in which 100% of the liquid crystal molecules were twisted by 240° between the substrates 1a and 1b. Such orientation of the liquid crystal molecules in each liquid crystal region 4 is illustrated in FIG. 5. Optionally, UV light with weak illuminance may be radiated at room temperature (i.e., 20° C.) in order to increase the cross-linking seat of the phase separated polymer walls 7.

Then, the phase plate (not shown) and the polarizing plate (not shown) are provided on each of the outer surfaces of the pair of substrates 1a and 1b in a desired manner, thereby completing the liquid crystal display device according to the first example of the present invention.

COMPARATIVE EXAMPLE

A liquid crystal display device according to a comparative example was produced as follows.

A liquid crystal material and a chiral agent were used which had a temperature dependency of pitch represented by a broken line in the graph shown in FIG. 2. Specifically, 2.3 parts of chiral agent (CN) was added per 100 parts of liquid crystal material SP 4862. The resultant mixture was mixed with a photopolymerizable resin and a photopolymerization initiator which were same as those used in the first example. Then, the liquid crystal material and the photopolymerizable resin were phase separated through the same steps as in the first example.

Upon this phase separation, domains were observed in which the liquid crystal molecules were twisted by 60° between the substrates (60° domains) at the vicinity of $T_{N-I}$ for about 5% in an observable plane of each liquid crystal region. When a temperature was lowered to room temperature at a same cooling rate as the first example, the 600 domains, i.e., domains of defective orientation, occurred in about 3% of the observable plane of each liquid crystal region.

EXAMPLE 2

Hereinafter, a liquid crystal display device according to a second example of the present invention will be described.

Transparent electrodes made of ITO (a compound of oxide indium and oxide tin, thickness: 50 nm) are formed on two glass substrates (thickness: 1.1 mm), respectively. A negative-type black resist OFPR-BK510S (Tokyo Ohka Kogyo Co., Ltd.) containing dispersed black pigment is uniformly applied to one of the substrates by spin coating. The substrate is thereafter sintered. Then, an exposure (light intensity: 200 mJ/cm$^2$) with a predetermined pattern is conducted using a first photomask having an opening narrower than the width of pixel light shielding portions, and is followed by development and rinsing. Then, after sintering is conducted, thereby forming a first black resin layer. An insulating material is obtained by mixing 0.1% by weight of plastic beads (Micropearl; produced by Sekisui Fine Chemical) having an average particle size of 4.5 $\mu$m in a negative-type photo resist material OMR 83 (produced by Tokyo Ohka Kogyo Co., Ltd.) in a uniformly dispersed manner. The insulating material is uniformly applied by spin coating. Thereafter, a second photomask which has an opening wider than that of the first photomask is used to perform an exposure (light intensity: 240 mJ/cm$^2$) with a predetermined intensity pattern, and is followed by development and rinsing. Subsequently, a liquid crystal spacer is formed which is made of a second "column-like" insulating layer obtained by after sintering. A sealant (Struct bond XN-21S, sintering temperature: 170° C./2 hrs) is patterned on the other substrate by printing. The resultant substrates are adhered to each other, thereby obtaining a liquid crystal cell.

Then, the following mixture is vacuum injected into the liquid crystal cell under low pressure. The mixture contains: as a photopolymerizable resin material, a mixture of monofunctional materials (i.e., 0.15 g of perfluorooctyl ethyl acrylate, 0.26 g of isobornyl acrylate and 0.19 g of p-phenyl styrene) and 0.15 g of bifunctional material R-684 (produced by Nippon Kayaku Co., Ltd.) (monofunctional material:multifunctional material=80:20); a mixture (4.25 g) obtained by mixing a liquid crystal composition ZLI-4792 (produced by Merck & Co., Inc.) with an optically active substance (chiral agent) having temperature dispersion characteristic in HTP (Helical Twisting Power) values, the mixture having the d/p value of 0.25 (d is about 4.5 μm) at a temperature of 40° C.; and 0.025 g of Irgacure 651 as a photopolymeric initiating agent. In this case, the HTP values of the optically active substance are $-(12.0\ \mu m)^{-1}$, $-(11.8\ \mu m)^{-1}$, and $-(11.6\ \mu m)^{-1}$ at the temperatures of 20° C., 40° C. and 60° C., respectively. Thereafter, the resin contained in the mixture is cured by radiating UV light for 5 minutes under a high pressure mercury lamp of 10 mW/cm$^2$ while applying an effective voltage of 2.5 V: 60 Hz between the transparent electrodes at a temperature of 110° C. Then, the liquid crystal cell including the mixture is cooled to 40° C. over a period of 5 hours and further cooled to room temperature (25° C.).

At such a temperature, the mixture is exposed by using the same UV light radiation device to complete the polymerization.

The HTP value is estimated from the following formula;

$$HTP=1/(pc)$$

where p and c respectively indicate the helical pitch of the liquid crystal material and the concentration (weight %) of the chiral agent added to the liquid crystal material. A negative sign is assigned to the HTP value if the liquid crystal material including the chiral agent has a left-handed helical structure.

Figure 6:
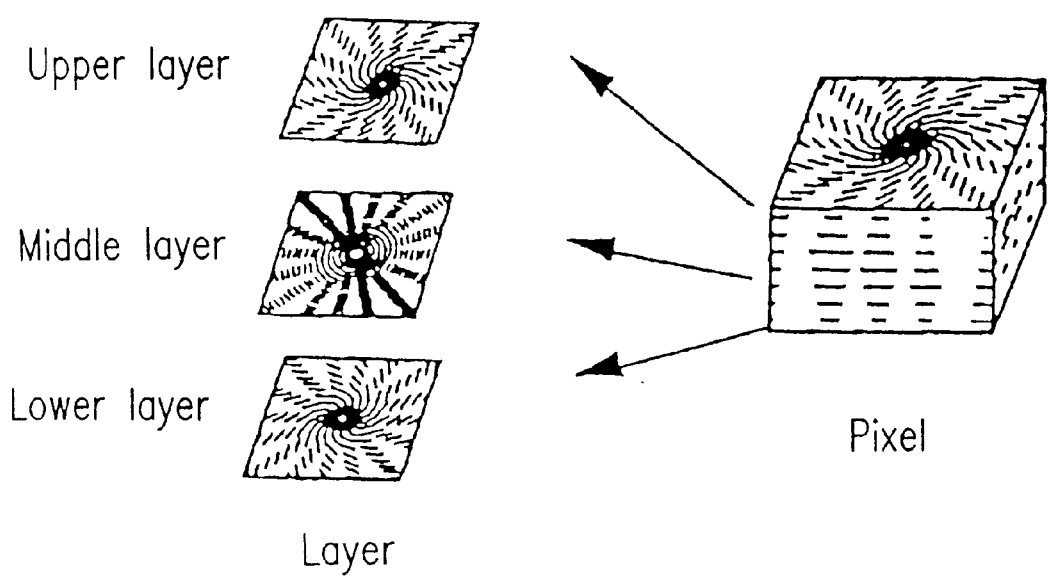
FIG. 6 is a perspective view schematically showing the liquid crystal molecules twisted by 90° between the substrates and oriented in the axially-symmetric manner according to the present invention.

The thus-produced cell was observed. Substantially all of the liquid crystal regions were in a mono-domain state in which liquid crystal molecules were oriented in a substantially uniform axially-symmetric manner with respect to an axis perpendicular to the substrates 1$a$ and 1$b$. When the liquid crystal cell was rotated while setting the two crossing polarizing plates, it was observed that a Schlieren pattern in each crystal region did not move while the surrounding polymer walls rotated. The axially-symmetric orientation may include a concentric orientation, a spiral orientation or a radial orientation. In FIG. 6, the direction of the liquid crystal molecules adjacent to the two substrates 1$a$ and 1$b$ (not shown) is twisted by about 90° while the liquid crystal molecules are oriented in the axially-symmetric manner.

Then, two polarizing plates having polarization axes intersecting each other are adhered on the surfaces of the liquid crystal cell, thereby obtaining a liquid crystal display device having the liquid crystal regions surrounded by the polymer walls.

The thus-obtained liquid crystal cell was observed by a polarizing microscope while applying a voltage. It was confirmed that by selecting an optically active substrate having a smaller temperature dispersion characteristic in HTP, a liquid crystal panel can be produced in which the axially-symmetric orientation and an optical characteristic are hardly affected by the change in the temperature, or the like, during the production of the liquid crystal cell.

According to the present invention, the helical pitch of the liquid crystal material becomes short at the vicinity of $T_{N-I}$ during the phase separation of the liquid crystal material and the photopolymerizable resin. Therefore, a low twisting phenomenon that normally occur when the pitch gets long, hardly occurs. As a result, a stable orientation with an intended twist angle can be obtained. Furthermore, even when the liquid crystal material and the photopolymerizable resin are not phase separated in a good manner, the intended twist angle is obtainable since a d/p value is within the intended margin at the vicinity of $T_{N-I}$.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:

a pair of substrates;

polymer walls;

a display medium interposed between the pair of substrates, including a liquid crystal region partially provided with or completely surrounded by the polymer walls;

wherein the liquid crystal region includes a liquid crystal material having a helical pitch, the helical pitch being either unchanged or reduced upon rise in temperature; and wherein liquid crystal molecules in the liquid crystal region are oriented in an axially-symmetric manner with respect to an axis perpendicular to the pair of substrates.

2. A liquid crystal display device according to claim 1, wherein liquid crystal molecules in the liquid crystal regions are oriented in a twisted manner.

3. A liquid crystal display device according to claim 2, wherein the liquid crystal molecules have a twisted angle of about 240°.

* * * * *